United States Patent [19]
Harel

[11] Patent Number: 5,873,081
[45] Date of Patent: Feb. 16, 1999

[54] DOCUMENT FILTERING VIA DIRECTED ACYCLIC GRAPHS

[75] Inventor: Dov Harel, Caesarea, Israel

[73] Assignee: Microsoft Corporation, Redmond, Wash.

[21] Appl. No.: 883,286

[22] Filed: Jun. 27, 1997

[51] Int. Cl.[6] ..................................................... G06F 17/30
[52] U.S. Cl. ........................................ 707/3; 707/4; 707/5
[58] Field of Search ........................................ 707/4, 5, 3

[56] References Cited

U.S. PATENT DOCUMENTS

| | | | |
|---|---|---|---|
| 5,175,814 | 12/1992 | Anick et al. | 345/348 |
| 5,265,065 | 11/1993 | Turtle | 707/4 |
| 5,418,948 | 5/1995 | Turtle | 707/4 |
| 5,430,870 | 7/1995 | Stanton et al. | 707/2 |
| 5,488,725 | 1/1996 | Turtle et al. | 707/5 |
| 5,765,149 | 1/1998 | Burrows | 707/5 |

*Primary Examiner*—Paul R. Lintz
*Attorney, Agent, or Firm*—Albert S. Michalik, Esq.

[57] ABSTRACT

A method and mechanism for for filtering incoming documents against user queries. A plurality of user queries including terms connected by logical operators is received. Terms and sub-expressions are combined into distinct sub-expressions and embedded into a directed acyclic graph (DAG) having a plurality of nodes. Each node in the DAG includes pointers to any successor nodes thereof, the terms in the queries are embedded as source nodes in the graph, and the operators embedded as internal nodes. When a document is received, the document is evaluated against the nodes in the DAG by comparing the relevant terms in the document with the source nodes in the DAG representative thereof. For each term that matches a source node, the internal successor node of the matched source node is evaluated based on the logical operator represented by the successor node and truth information of the predecessor nodes thereto, thereby determining a truth value of the internal successor node. Information is returned indicative of which of the successor nodes were evaluated as true. From that information, the queries which matched the document and the users corresponding thereto can be determined.

15 Claims, 13 Drawing Sheets

DOCUMENT FILTERING VIA DIRECTED ACYCLIC GRAPHS

FIELD OF THE INVENTION

The invention relates generally to the electronic document retrieval, and more particularly to a method and system of retrieving documents that match user queries.

BACKGROUND OF THE INVENTION

The task of electronic document filtering involves determining which documents in a stream of incoming documents match which queries in a collection of user queries. The user queries generally consist of one or more search terms (or document properties) connected by one or more Boolean operators. This task is alternatively referred to as "selective dissemination of information," or as the "inverted query problem."

Two main types of retrieval models are used in filtering systems. The first type is a simple and intuitive Boolean retrieval model, also called the "exact match" model, in which the user queries are expressed in Boolean logic, and a document either does or does not match a given query. The second type is the probabilistic model, in which the retrieval function produces a ranking of the documents, in an order based on the estimated relevance of each document to the query.

The primary difficulties in document filtering arise from the massive scale of queries to be evaluated against the high frequency of incoming documents to be filtered. For example, news filtering on the Internet may involve dealing with a stream of one or more documents per second, with each document being filtered against millions of user queries. Comparing each document against each query is impractical, as providing the hardware capable of performing acceptable throughput is cost-prohibitive.

As a result, known filtering systems reduce the time taken to examine a document by first eliminating all queries which are irrelevant to a given document. For example, a relatively rapid test can be performed to eliminate any monotone queries (queries which do not contain non-monotone operators such as negation) which consist solely of words which are not in the document. Moreover, statistical techniques can speed up the detection of a query's relevance or irrelevance to a particular document, such as by first searching the document with the least frequent trigram (three-character string) in each query to first eliminate queries when documents do not contain that trigram.

However, after the irrelevant queries have been eliminated, the document still must be tested against the (possibly large) number of remaining queries, and such testing is relatively slow. Moreover, if non-monotone operators are allowed, initially eliminating queries having non-monotone operators significantly complicates the pre-filtering elimination process. Lastly, probabilistic filtering approaches are even slower than exact-match approaches, and thus even more difficult to scale to large systems.

OBJECTS AND SUMMARY OF THE INVENTION

Accordingly, it is a general object of the present invention to provide a method and mechanism for rapidly and efficiently filtering documents against a collection of queries.

A related object is to provide the method and mechanism for a large retrieval system involving a relatively large number of incoming documents and a relatively large numbers of queries.

In accomplishing those objects, it is a related object to provide a method and mechanism as characterized above that function with non-monotone operators and are capable of providing probabilistic rankings of documents.

Another object is to provide a method and mechanism of the above kind that is capable of simultaneously filtering multiple documents at the same time against a collection of queries.

Yet another object is to provide a method and mechanism as characterized above that can be utilized with techniques for predetermining relevant terms in a document.

Another object is to provide a method and mechanism that is cost-efficient, reliable and extensible.

Briefly, the present invention provides a method and mechanism for filtering incoming documents against user queries. A plurality of user queries including terms connected by logical operators is received and embedded into a directed acyclic graph (DAG) having a plurality of nodes. Each node in the DAG includes pointers to any successor nodes thereof, the terms and phrases in the queries (which are leaves of input expression trees) are embedded as source nodes in the graph, and the operators embedded as internal nodes. As used herein, internal nodes are nodes with at least one predecessor, that is, nodes which are not source nodes. When a document is received, the document is evaluated against the nodes in the DAG by comparing the relevant terms in the document with the source nodes in the DAG representative thereof. For each term that matches a source node, the internal successor node of the matched source node is evaluated, based on the logical operator represented by the successor node and truth information of the predecessor nodes thereto, thereby determining a truth value of the internal successor node. Information is returned indicative of which of the successor nodes were evaluated as true.

Other objects and advantages will become apparent from the following detailed description when taken in conjunction with the drawings, in which:

DETAILED DESCRIPTION OF THE PREFERRED EMBODIMENT

Figure 1:
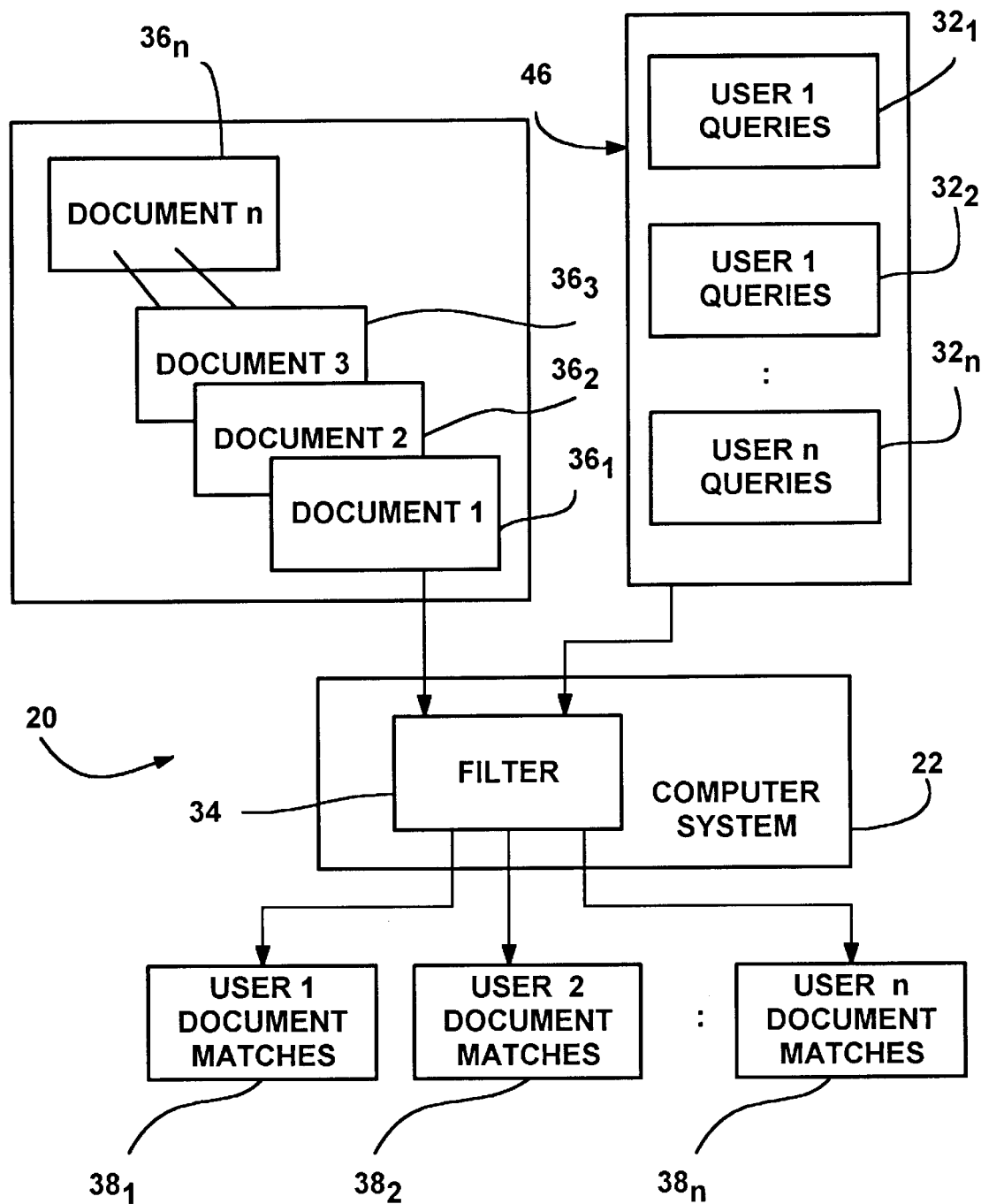
FIG. 1 is a block diagram representing a computer system into which the present invention may be incorporated.
Figure 2:
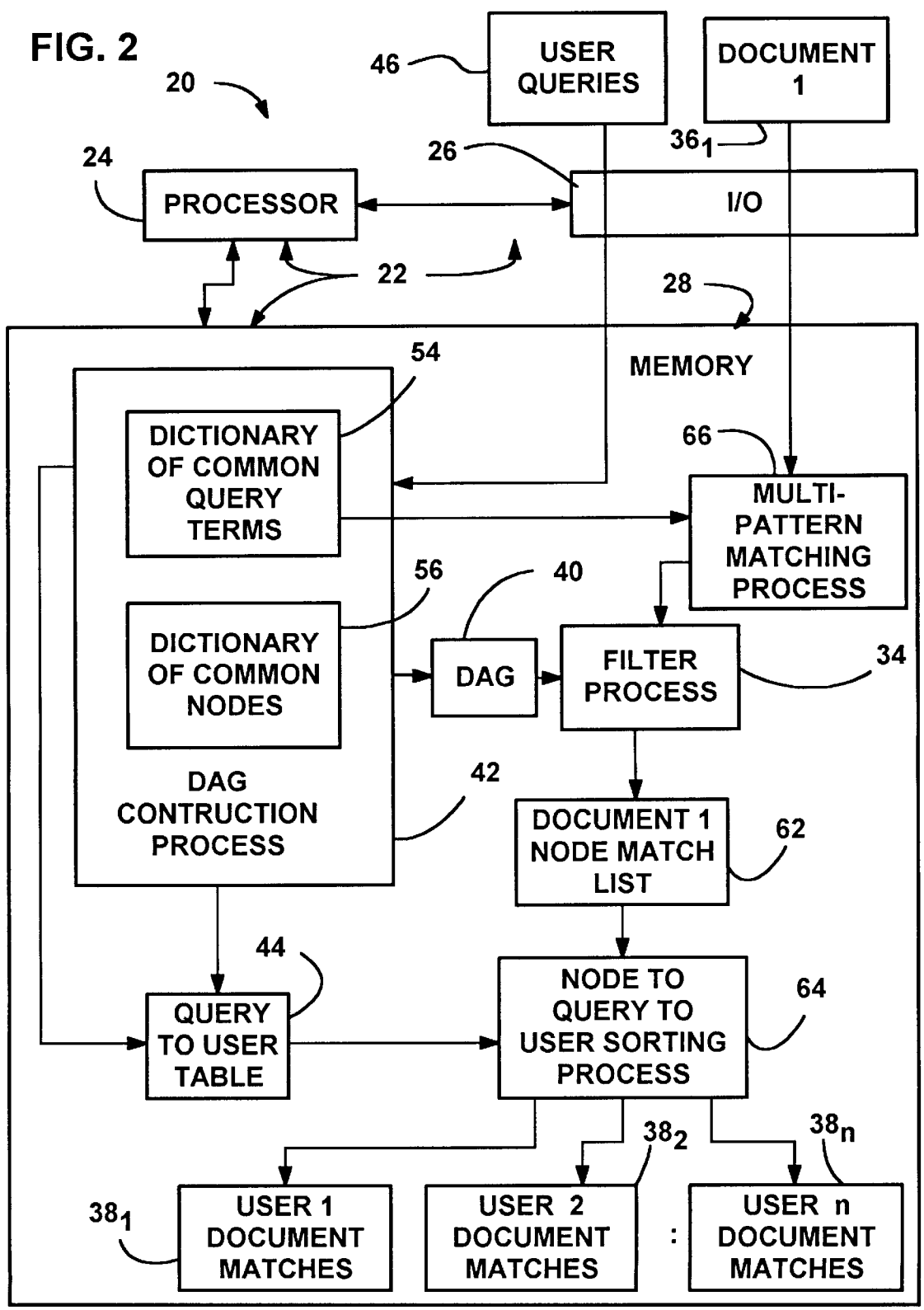
FIG. 2 is a block diagram representing a number of components in a computer system for implementing the present invention.

Turning to the drawings and referring first to FIGS. 1 and 2, there is shown a system generally designated 20 into which the present invention may be incorporated. As best shown in FIG. 2, the system 20 comprises a computer 22 including a processor 24, input-output (I/O) circuitry 26 and a memory 28. The computer 22 is preferably a high-powered machine containing at least one high-speed processor and a large amount of virtual memory. As shown herein, the memory 26 is intended to represent any storage means, including volatile and non-volatile storage, (which can be used as virtual memory via known swapping techniques), however, for purposes of speed it is desirable to have large amounts of actual RAM.

As represented in FIG. 1, a number of user queries $32_1$–$32_n$ are provided to a filtering process 34 within the computer 22. As each document $36_1$–$36_n$ arrives from some source of information such as the Internet, the filter process 34 evaluates the content (e.g., text or some other property) of that document $36_1 36_n$ against the user queries $32_1$–$32_n$. As described in more detail below, the present invention is further capable of simultaneously evaluating a batch of documents against the user queries.

Whether one document or a batch of documents is evaluated, each document is effectively tested against all of the relevant queries, as also described in more detail below. When a document satisfies a given query, that document is associated with the query and thereby made available for delivery to each user that submitted that corresponding query. For example, in one retrieval system, it is expected that the users will receive the documents which match their query or queries at some predetermined interval, such as once or twice per day, depending on numerous possible variables such as type of subscription, amount of matched documents, and so on. In any event, so that the user can later retrieve those documents, a list of documents which match each user's query or queries is maintained in some table $38_1$–$38_n$ or the like.

In accordance with one aspect of the invention, the filtering process 34 does not individually test each document against every query, but instead first combines the queries, many of which are common to one another, into a collection of distinct queries. The filtering process 34 then evaluates the document against only the collection of distinct queries. The present invention thus takes advantage of the likelihood that many users will submit queries which are logically identical, at least in part, to queries and parts thereof submitted by other users. Common expressions need only be tested once, and those expressions which match a document are associated with the queries corresponding thereto.

To accomplish the combining of common queries and/or parts thereof, the filtering process 34 utilizes a directed acyclic graph, i.e., DAG 40 (FIG. 2), for logically and functionally representing the queries. More particularly, the DAG 40 comprises a logical graph of nodes, wherein each source node represents a query (search) term submitted by one or more users, and each internal node represents an expression, i.e., a Boolean operator for operating on one or two other nodes. Such a graph is known as directed because edges between the nodes have a direction, and acyclic because traversing the graph will not cycle back to a previous node. Note that a source node is a particular case of a node that is not a successor of any other node. Each source node or internal node has information stored therewith including a type (source or internal node), value (true, false or some value therebetween), query operator (e.g., AND, OR) and a pointer to each successor node thereof, if any. The number of predecessors of a node is often referred to as the in degree of the node. It is sufficient to deal with binary and unary operators which produce graphs whose in degree is bounded by 2. This is because graphs with arbitrary in degree can be embedded in graphs with in degree bounded by 2. Other information may be stored with a node, (e.g., information about its predecessor nodes), as described below.

The DAG 40 is generated from the user queries by a DAG construction process 42, which as described in more detail below with reference to FIGS. 3A–3D, handles the combining of common queries into a distinct query. For example, if eight users individually submit queries seeking all documents containing the terms "stocks and bonds," the DAG construction process 42 will construct the DAG 40 such that the eight queries will be represented as one query consisting of source nodes "stocks" and "bonds" connected by an AND node. To associate the query with the users that submitted the query expression, the node representing the single query is mapped to those eight queries, and the queries to the users, such as in a query-to-user table 44. Moreover, common terms and sub-expressions are also combined, e.g., if other users seek documents containing "bonds and currency," the same source node in the DAG will represent the term "bonds" in both the distinct "stocks and bonds" and "bonds and currency" queries. As will be understood below, exploiting this commonality property in a DAG 40 in accordance with the invention provides substantial improvements in document filtering throughput.

Turning to an explanation of the construction of the DAG 40, with particular reference to the flow diagram of FIGS. 3A–3D, a file 46 containing the user queries is provided to the DAG construction process 42. Note that this file 46 can change each time a user adds, deletes or modifies a query. However the DAG 40 can be reconstructed to reflect the current state of user queries at the discretion of the document retrieval service. For example, query changes received by eleven P.M. will be built into a new DAG 40 for the next day's filtering.

In the following example, a DAG 40 will be constructed based on a file 46 containing the following queries, where "&" represents the Boolean AND operator and "|" represents the Boolean OR operator, and having the usual precedence among Boolean operators (e.g., "&" precedes "|"):

MSN & AOL
AOL & Prodigy
Lycos | Yahoo
Lycos & Alta Vista
AOL & MSN | AOL & Prodigy
(AOL & Prodigy) | Lycos
(Lycos | Yahoo) (Lycos & Alta Vista)
(AOL & Prodigy) & ((Lycos Yahoo) | (Lycos & Alta Vista))
Prodigy & AOL Note that the above terms in the file 46 are actual query terms entered by users, and are not intended to represent searching services or on-line services. Also, a two-word term such as Alta Vista is allowable, e.g., by submitting the query with the words "Alta Vista" in quotes or the like.

Figure 3A:
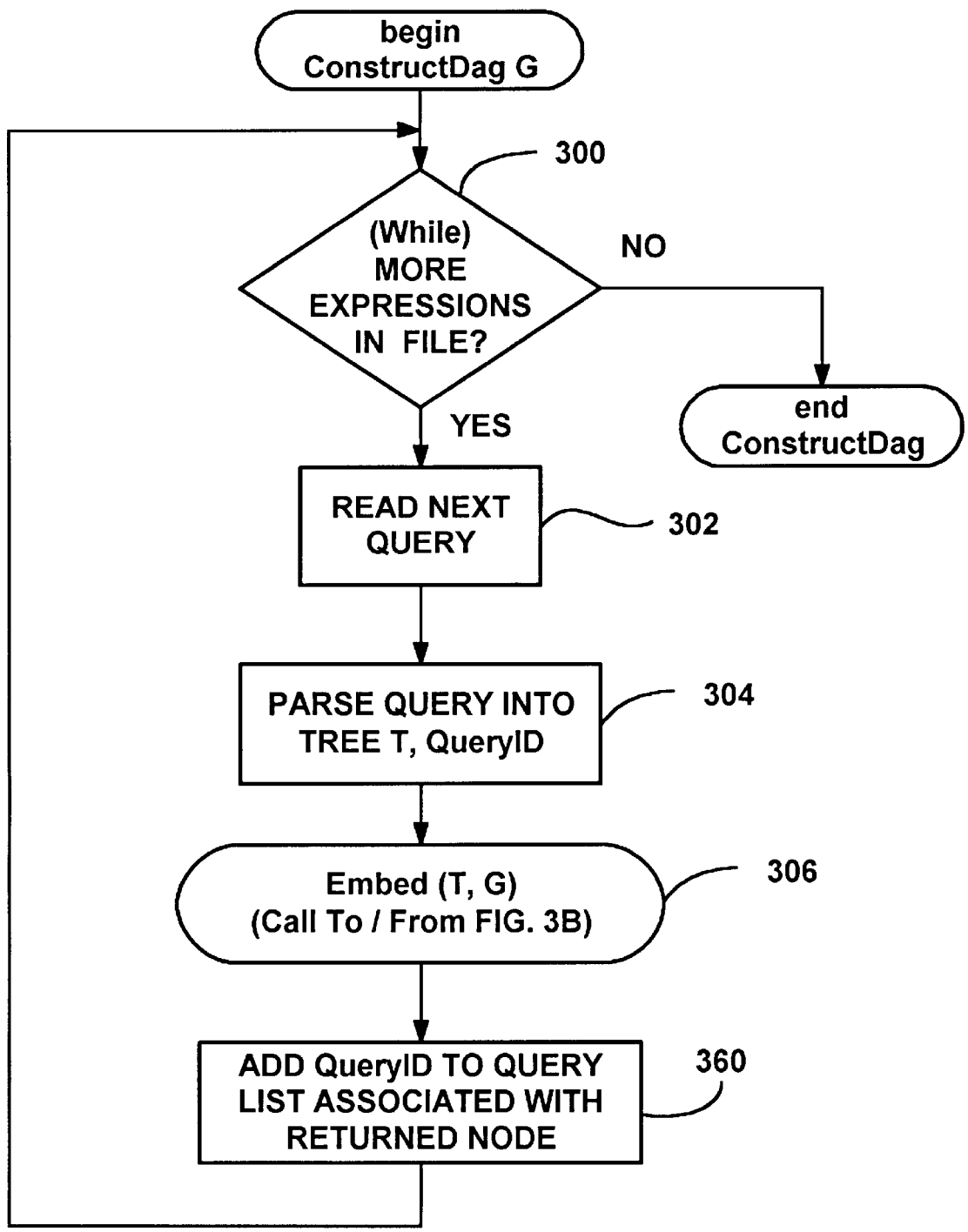
FIGS. 3A–3D comprise a flow diagram representing the general steps taken to construct a directed acyclic graph in accordance with one aspect of the present invention.
Figure 3B:
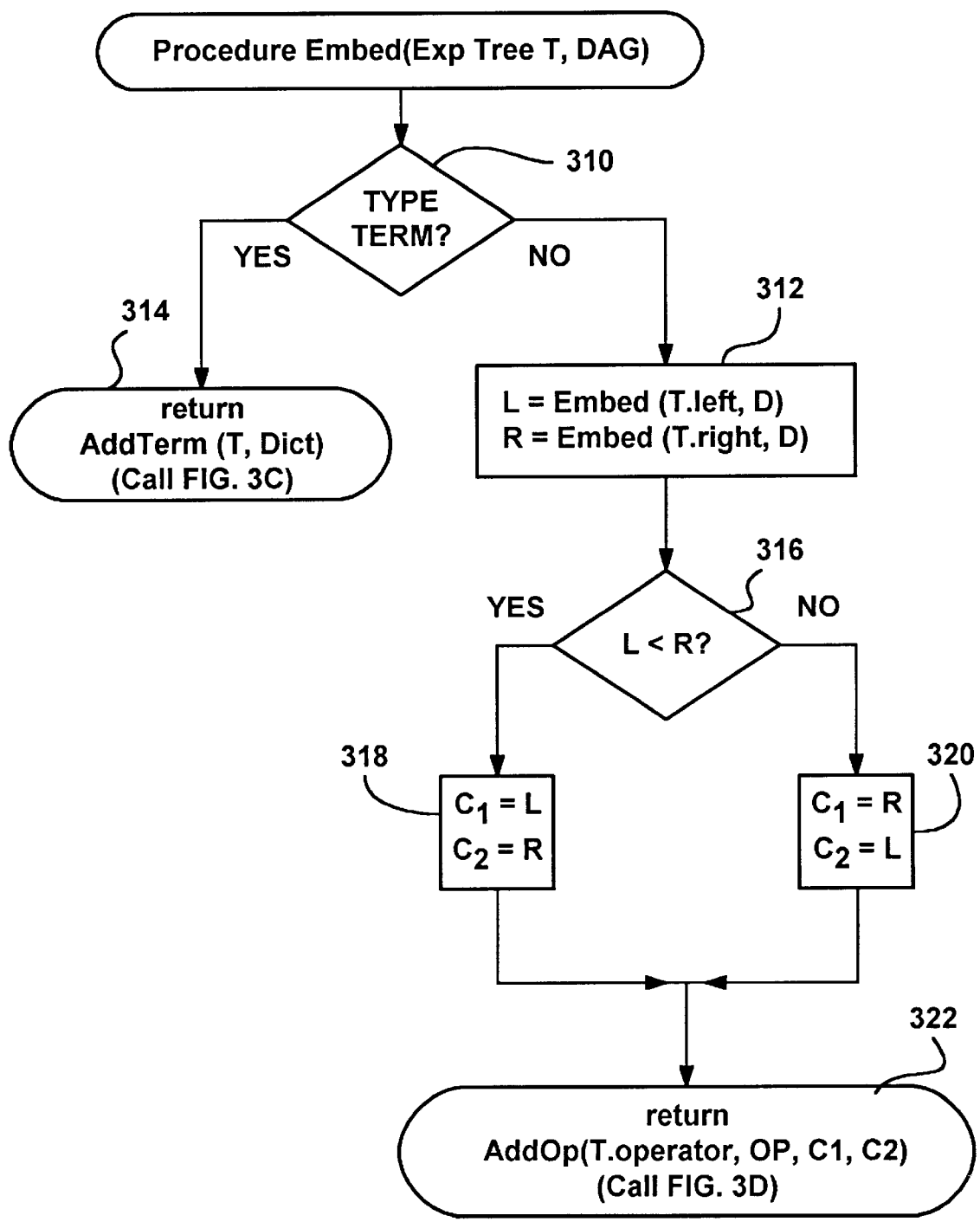
Figure 4A:
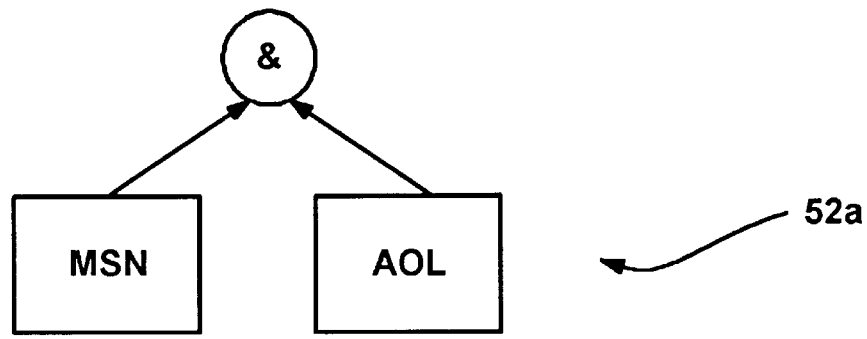
FIGS. 4A–4C represent exemplary expression trees used in constructing the directed acyclic graph based on a collection of user queries.

As an initial step 300 (FIG. 3A), the file 46 of query terms is examined to determine if a query is present, that is, the construction process 42 performs a "while" loop until all user queries are handled. Since in the present example a first query, consisting of the expression "MSN & AOL," is present, step 302 reads this query. Step 304 parses the query into an expression tree 52a, conceptually represented in FIG. 4A, having a first source node "MSN" and a second source node "AOL," connected by an internal node of operator "&." This query is also assigned a query identifier at step 304, referred to herein as QueryID1. Note that steps 302 and 304 are typically performed by calls to separate read and parse functions. Control then passes to step 306, which calls an "Embed()" function, (FIG. 3B), passing the expression tree thereto.

In general, the Embed() function embeds the nodes and terms of the expression into the DAG 40, using common nodes and terms already embedded in the DAG 40 when possible. The Embed() procedure of FIG. 3B thus begins by examining the expression tree 52a, in the present example, beginning with the "&" node therein connecting "MSN" and "AOL." Since the first item in the tree is a node, step 310 branches to step 312, which recursively calls the Embed() procedure, passing the procedure its left child, the term "MSN." Thus, step 310 is again executed, this time for this "left child" Embed() call, wherein "MSN" is determined to be a term. Accordingly, for "MSN," step 310 branches to step 314, which in turn calls an AddTerm() procedure, represented in FIG. 3C.

Figure 5:
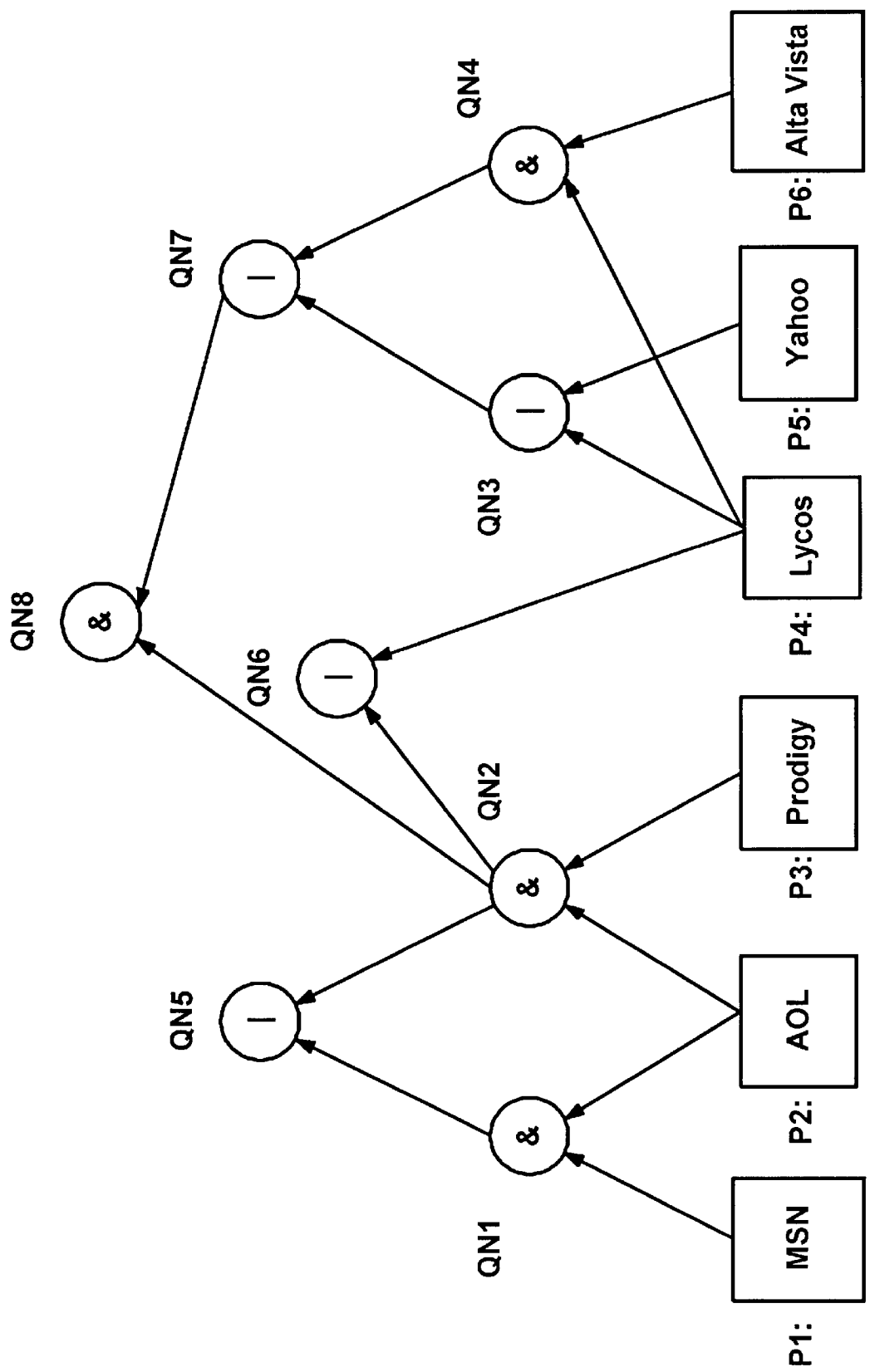
FIG. 5 represents a directed acyclic graph containing exemplary query information after construction in accordance with the flow diagram of FIGS. 3A–3D.

During the DAG construction process 42, a dictionary 54 of terms is built and maintained for the distinct terms in all of the queries. One such dictionary may be based on Self Adjusting Trees (i.e., Splay Trees). Step 330 of the AddTerm() procedure (FIG. 3C) thus first searches the term dictionary 54 for "MSN," while step 332 subsequently tests the search result to see if "MSN" was found in the dictionary 54. At this time the term "MSN" is not present, whereby steps 334 and 336 are executed, and "MSN" is added as a source node to the DAG 40 (as represented in FIG. 5) and the term dictionary 54, respectively. Note that a simple hashing operation or the like may be performed to test for the term's existence in the dictionary 54 and to add the term if not present.

Regardless of whether the term previously existed in or was added to the term dictionary 54, an offset pointer or the like to the term in the dictionary 54 is returned from the AddTerm() procedure at step 338. In the present example, this pointer equals P1 for the first term entry, "MSN," and thus step 312 sets its left child pointer ("L") equal to P1. Next, step 312 again recursively calls the Embed() procedure, this time passing its right child, the term "AOL," as a parameter. As can be appreciated, since "AOL" is a term, step 310 of this nested "right child" Embed() call similarly branches to step 314 to call the AddTerm() procedure of FIG. 3C. In FIG. 3C, steps 330 and 332 do not find "AOL" in the term dictionary 54, and thus "AOL" is added to the DAG 40 (FIG. 5) and the term dictionary 54 by steps 334–336. A pointer to "AOL" (equal to P2) is then returned at step 338, whereby the right predecessor node pointer ("R") is set equal to P2 at step 312.

At this time, the left and right predecessor nodes of the "&" node are known to exist in the DAG 40. Accordingly, as part of the "&" node Embed() procedure, a test needs to be performed to determine if an "&" node is already present in the DAG 40 connecting the two predecessor nodes (MSN, AOL) thereof. Thus, once the recursive calls to the Embed() procedure of step 312 have been completed, step 316 is executed to test the relative values of the pointers. More particularly, nodes are searched for (and always stored) in a node dictionary with the first node pointer being smaller than the second. As can be appreciated, this saves space and search time because the same terms (in the reverse order) may have been entered via a previous query. For example, "MSN & AOL" and "AOL & MSN" are logically equivalent expressions, and thus consistently storing the node, indexed by (&, P1, P2), regardless of the initial order of the terms, saves space and search time.

To ensure the proper pointer ordering, step 316 compares the values of each pointer. If the left node is smaller, at step 318, a variable, C1, is set to the left node pointer, and another variable, C2, to the right node pointer. If not smaller, C1 is set to the right pointer and C2 to the left at step 320. In this manner, if the (otherwise equivalent) terms are reversed, the pointers are effectively swapped, whereby C2 is always greater than C1. Note that the opposite arrangement (C1 always greater than C2) would also work, as long as consistency is maintained. The above process is sometimes referred to as canonical ordering in the professional literature.

Figure 3C:
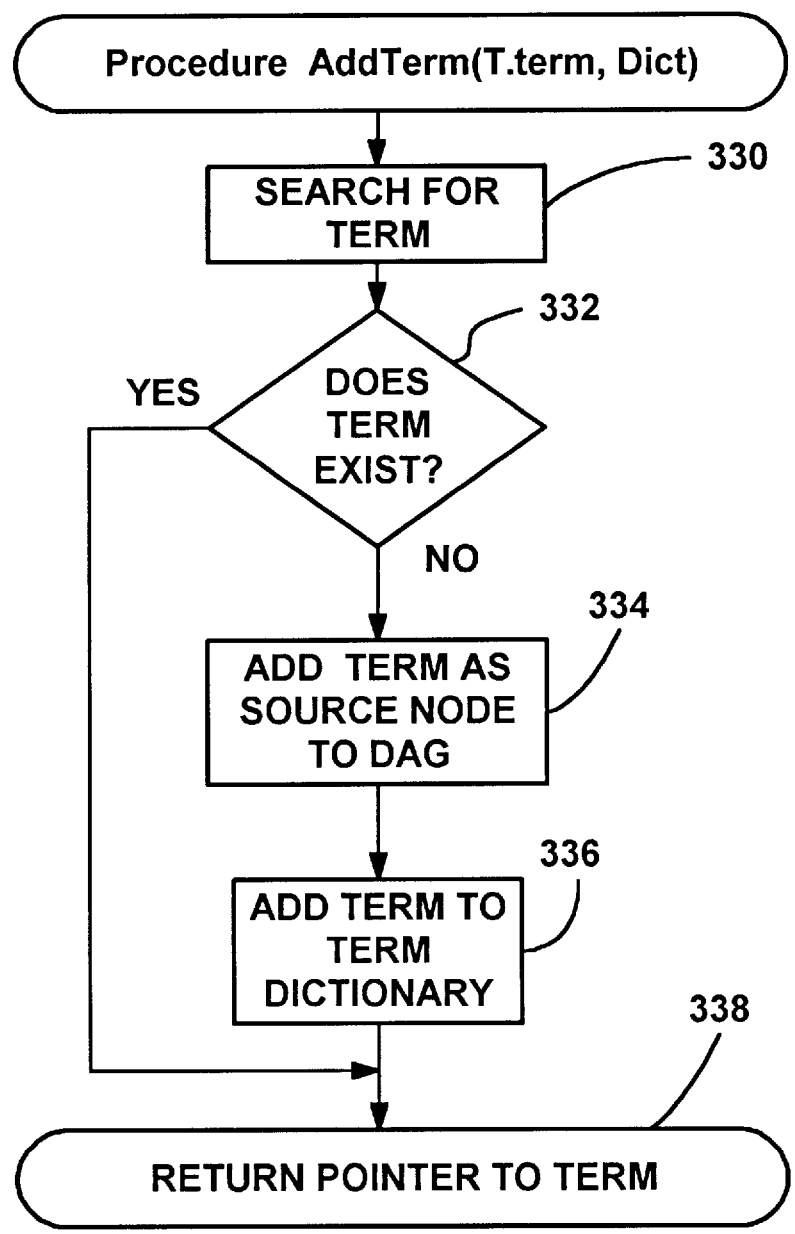
Figure 3D:
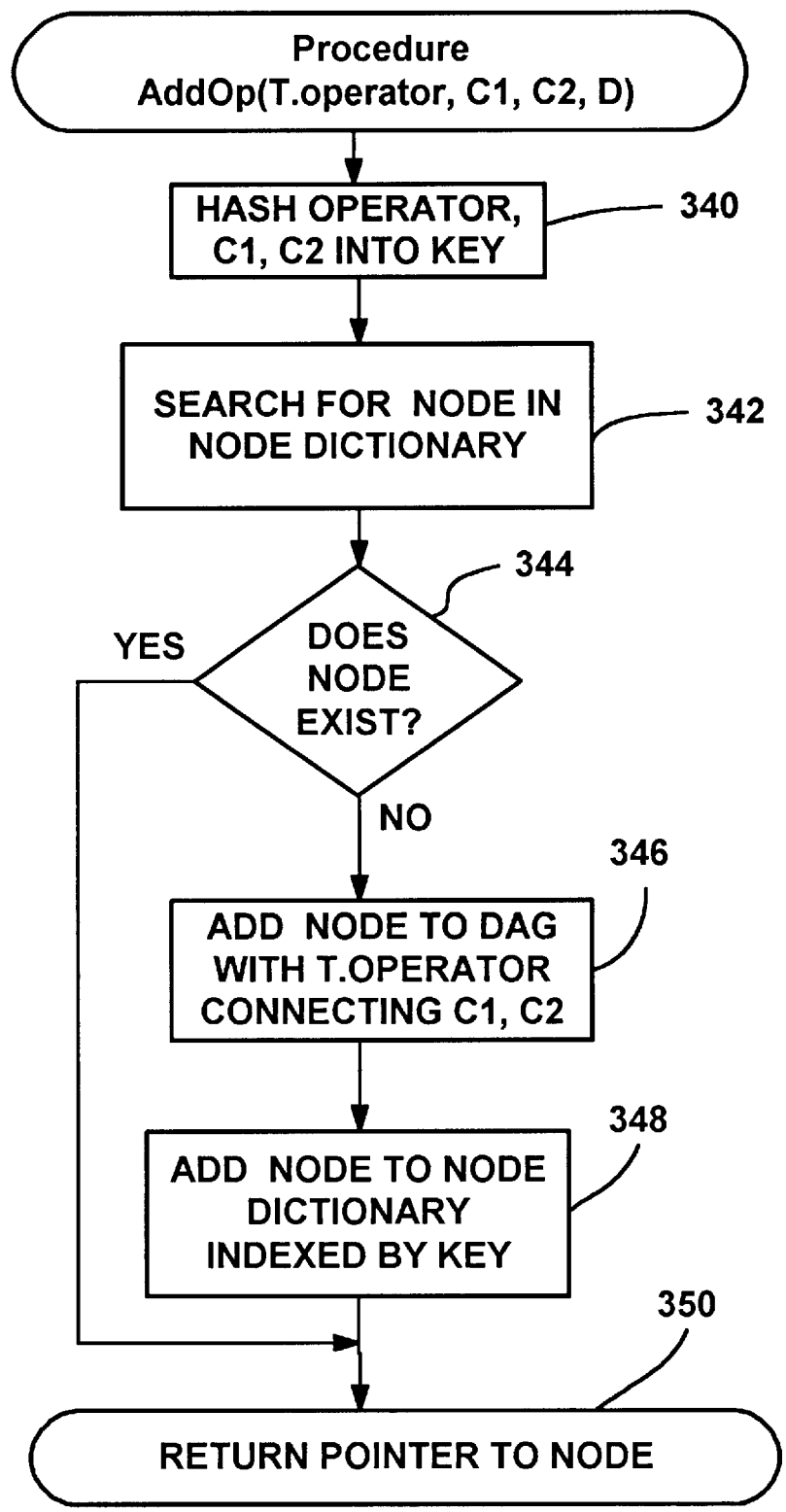

Step 322 then calls the Addop() procedure of FIG. 3D, which tests for the presence of the node in the DAG 40 and adds it thereto if not already present. To test for the presence of the node, the "&" operator, C1 and C2 are first hashed into a key at step 340. Using this key, at step 342, a search of a node dictionary 56 (hash table) is commenced to determine if a pointer to this node is already present in the dictionary 56, and thus is already connecting the two terms in the DAG 40. If the entry in the node dictionary 56 does not indicate that such a node is present for these terms, step 344 branches to step 346 to add the node to the DAG 40. Since the DAG 40 is represented as a data structure, such embedding consists of appending information to the data structure by allocating space for the internal node representing this query, and adding a pointer thereto to a list of nodes pointed to by each of the internal node's predecessor nodes. Also, step 348 is executed to add an entry for this node in the node dictionary, indexed by this key. In this manner, the node dictionary 56 is built up as nodes are added to the DAG 40. Whether or not the node is added, a pointer to the node is returned at step 350.

In the present example, an "&" node is not detected at step 344, and thus a new "&" node, identified herein by the pointer *QN1, is added to the DAG 40 at step 346 and the node dictionary 56 at step 348, e.g., (&, P1, P2)=*QN1, where the asterisk (*) indicates a pointer. This is conceptually represented in a portion of FIG. 5, where it is shown that both of the terms "MSN" and "AOL" have pointers to the node identified as QN1.

It should be noted that the node dictionary 56 may be incorporated into the DAG 40, i.e., the DAG 40 itself may be used as the node dictionary 56 if the information stored for each node embedded in the DAG 40 includes pointers to the terms and/or nodes that are its left and right predecessor nodes. However, as will be described below, with certain enhancements to the exact-match model of the filtering process of the present invention, each node in the DAG 40 need not necessarily track the pointers to its predecessor nodes, thus conserving a substantial amount of memory in a (typically) very large DAG.

Once the expression tree 52a has been embedded into the DAG 40, the process returns to step 360 of FIG. 3A, with a pointer to the QN1 node. At step 360, the query identifier from which the expression tree was derived, QueryID1, is added to a list of query identifiers maintained for each node. The list is maintained so that the query (QueryID1) is associated with the node that represents it (QN1) in the DAG 40. Note that the list may be maintained within the DAG 40 in part of the space allocated for each node, or may be separate from the DAG 40.

Figure 4B:
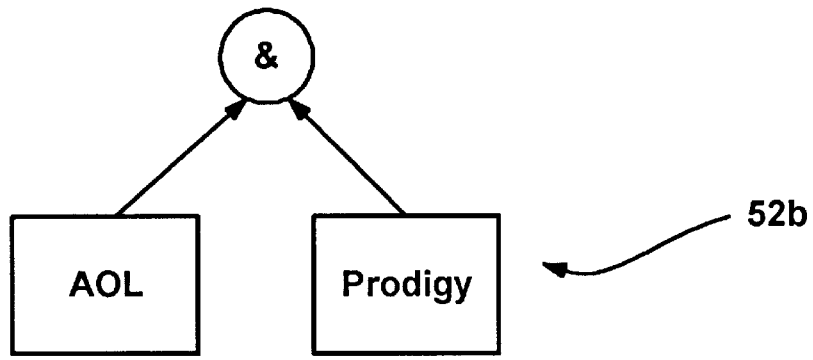

As shown in FIG. 3A, the process returns to step 300, where the next query is detected and consequently read at step 302. This time, step 304 creates an expression tree 52b (FIG. 4B) consisting of the terms "AOL" and "Prodigy" connected by an "&" node, and step 360 passes the tree to the Embed() procedure of FIG. 3B.

In the Embed() procedure, the "&" operator is first tested at step 310, and since it is not a term, step 310 branches to step 312. Again, step 312 recursively calls the Embed() procedure, passing its left child node, "AOL" thereto. When the term "AOL" is evaluated at step 310 and determined to be a term, step 314 calls the AddTerm() procedure to search the term dictionary 54 at step 330 (FIG. 3C). This time, however, step 332 determines that the term "AOL" is already present therein. Accordingly, steps 334–336 are bypassed, and the existing pointer (equal to P2) to the term "AOL" is returned at step 338. In this manner, common terms are only embedded once into the DAG 40 and the node dictionary 54.

The process returns to step 312 for recursively calling the embed procedure with the right term or node. However, unlike "AOL," the next term, "Prodigy," does not have an entry in the term dictionary 54. Thus via the AddTerm() procedure, (steps 330–338 of FIG. 3C), as described above, the term "Prodigy" is added to the DAG 40 and the term dictionary 54, and a pointer (equal to P3) is returned therefor. The process then continues to step 314 to test for the presence of an "&" node connecting "AOL" to "Prodigy," appropriately adding the node if not found.

Thus, after setting C1 to P2 (*AOL) and C2 to P3 (*Prodigy) at steps 316 and 318 of FIG. 3B, steps 340–344 of FIG. 3D determine that such a node does not already exist, i.e., there is no node entry in the node dictionary 56 for (&, P2, P3). Thus, at step 346 of FIG. 3D, the AddOp() procedure adds a new node, QN2, into the DAG 40 to connect these terms, as shown in FIG. 5. Also, step 348 adds the QN2 node to the node dictionary at step 348. A pointer to the QN2 node is returned at step 350 of FIG. 3D, and at step 360 of FIG. 3A, QueryID2 is added to the list of queries associated with the node QN2.

As can be appreciated by following steps 300–360 as described above, the next two queries ("Lycos | Yahoo," "Lycos & Alta Vista" assigned QueryID3 and QueryID4, respectively) are added to the respective term and node dictionaries 54 and 56, and embedded into the DAG 40, in the same manner as described above. Thus, the term "Lycos" is identified by a pointer of relative value P4, "Yahoo" by a P5 and "Alta Vista" by a P6. The query nodes which represent these query expressions are added to the node dictionary 56 and/or DAG 40 as generally shown in FIG. 5, i.e., (|, P4, P5)=*QN3 and (&, P4, P6)=*QN4.

Figure 4C:
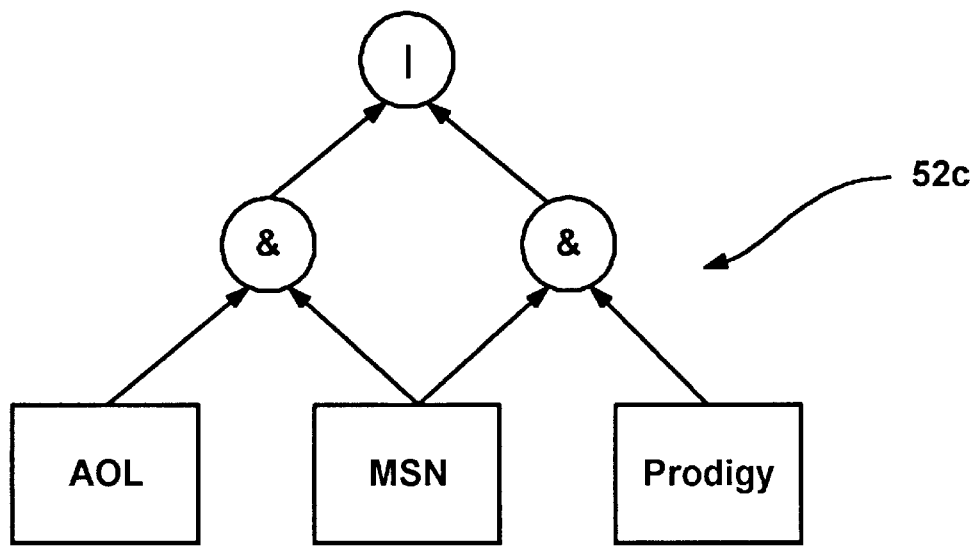

However, when the fifth query, QueryID5 is parsed at step 304 into an expression tree 52c (FIG. 4C), the expression tree is more complicated because at least one predecessor node of a node is itself an internal node of the expression tree. However, as will be seen, the recursive calling, via the Embed() procedure, will handle the embedding of the expression tree 52c in a similar manner.

To embed the more complex expression tree 52c, the Embed() procedure begins by testing the "|" operator at step 310. Since this operator is a node, not a term, step 310 branches to step 312 wherein the Embed() procedure is recursively called to first determine the left child of the current node. This time, the left child is determined to be an "&" node at step 310, and thus step 310 again branches to step 312. The Embed() procedure is again called to determine the left child of this left "&" node. On this next call, however, step 310 determines that the left child node of the "&" node is a term, "AOL," and thus branches to step 314. Step 314 calls the AddTerm() procedure, which, as is understood, finds "AOL" in the term dictionary (steps 330–332) and thus skips to step 338 to return a pointer of P2, (*AOL).

Similarly, in the second part of step 312, the Embed() procedure is again called, this time to establish the right child of the left "&" node, "MSN." As can be appreciated, the above-described steps 330, 332 and 338 are executed for "MSN," and return a pointer of P1. At this time, both children of the left "&" node have been identified, and thus the left "&" node Embed() call continues to step 316.

Step 316 determines that the left pointer is greater than the right, and thus branches to step 320 where C1 is set to the right pointer value of P1, and C2 is set to the left pointer value of P2. The AddOp() procedure of FIG. 3D is then called by step 322 to determine if this "&" node is already present in the DAG 40. The AddOp() procedure appropriately hashes (&, P1, P2) into a key, and determines from the node dictionary 56 (steps 342–344) that an "&" node, QN1, already connects these two terms in the DAG 40. The AddOp() procedure thus skips to step 350 and returns the pointer (*QN1) to this node.

As can be appreciated, the right "&" child of the "|" node is determined in substantially the same manner, i.e., at step 312 the Embed() procedure is called recursively for the right "&" node to determine that its left and right children are "AOL" and "Prodigy," respectively. For simplicity, this call will not be described in detail, because other than having different children, the right "&" node operation substantially follows the above description of the left "&" node. Thus, when the AddTerm() procedure is called by the Embed() procedure for the left term "AOL," and later for the right term "Prodigy," it is determined that each term is already in the DAG 40, having respective pointers of P2 and P3. Similarly, the AddOp() procedure determines (using C1=P2 and C2=P3) that the "&" node connecting these two terms already exists in the DAG 40, with a pointer of QN2, i.e., (&, P2, P3)=*QN2.

At this time, the construction process returns to the "|" node level, i.e., the left and right children of the "|" node are known and the recursive Embed() calls are complete. Since *QN1 is less than *QN2, step 316 of FIG. 3B branches to step 318, whereby C1 is set equal to *QN1 and C2 to *QN2. Step 322 calls the AddOp() procedure (FIG. 3D) to add the "|" operator to the DAG 40, if not already present.

Thus, step 340 of FIG. 3D hashes the triple of (|, *QN1, *QN2) into a key, and step 342 searches for an entry having this key. Step 344 determines that there is no such entry at this time, whereby step 346 adds the "|" to the DAG 40 by providing QN1 and QN2 with pointers to QN5 (FIG. 5). Step 348 adds the pointer *QN5 as an entry to the node dictionary 56, indexed by the hashed key of (|, *QN1, *QN2). Step 350 returns the pointer of QN5, and step 360 adds QueryID5 to the list of queries associated with the node that represents it (QN5) in the DAG 40.

It can be readily appreciated that that no matter how complicated an expression, the Embed() procedure recursively calls itself with a less complicated expression until a node having two terms is reached. At that time, the predecessor nodes are known (for the left branch, and later for the right), and thus the process walks back up toward the top of the expression tree, filling in the left and right children of internal successor nodes with the pointers to terms or internal nodes. These pointers in turn are used to determine or establish the identity of their parent node, until the topmost parent node in the expression tree is known.

For purposes of simplicity, the construction of the DAG 40 with respect to the remaining queries will not be individually described in detail. Instead, as can be appreciated by following the steps of FIGS. 3A–3D, in conjunction with the list of queries set forth above, the DAG 40 is constructed in the manner represented by FIG. 5. Note that when QueryID6 is evaluated, its right child is an existing term, "Lycos," while its left child is an existing node, QN2. However, as can be appreciated by reviewing steps 300–360 with respect to an expression tree for this sixth query, the construction process still tests for and/or adds the appropriate nodes to the DAG 40. Note that the node dictionary 56 is capable of hashing triples of an operator and two other pointers, whether the pointers both point to source nodes, both to internal nodes, or to one source node and one internal node. Thus, the new node, QN6, is embedded into the DAG 40 as shown in FIG. 5, in the same general manner as described above.

It should be further noted that when the ninth query, QueryID9, is evaluated, an equivalent node, QN2, (with reversed predecessor nodes) is present in the DAG 40. As a result, no new node is added to the DAG 40 or to the node dictionary 56, and instead, the equivalent node of QN2, is returned to step 360. Accordingly, step 360 adds QueryID9 to the list of nodes associated with QN2.

At this time the DAG 40 is constructed. Note that as queries are embedded into the DAG 40, the identities of the users who submitted those queries are preserved in conjunction with those queries, e.g., via the table 44 (FIG. 2). As a result, when a query node of the DAG 40 is found to match a document, the list of QueryIDs associated with that node is accessed to determine those queries, from which the corresponding users are derived. Although not necessary to the invention, the DAG 40, which is typically huge, is preferably compiled into a compact linear form for faster storage and retrieval.

Figure 6A:
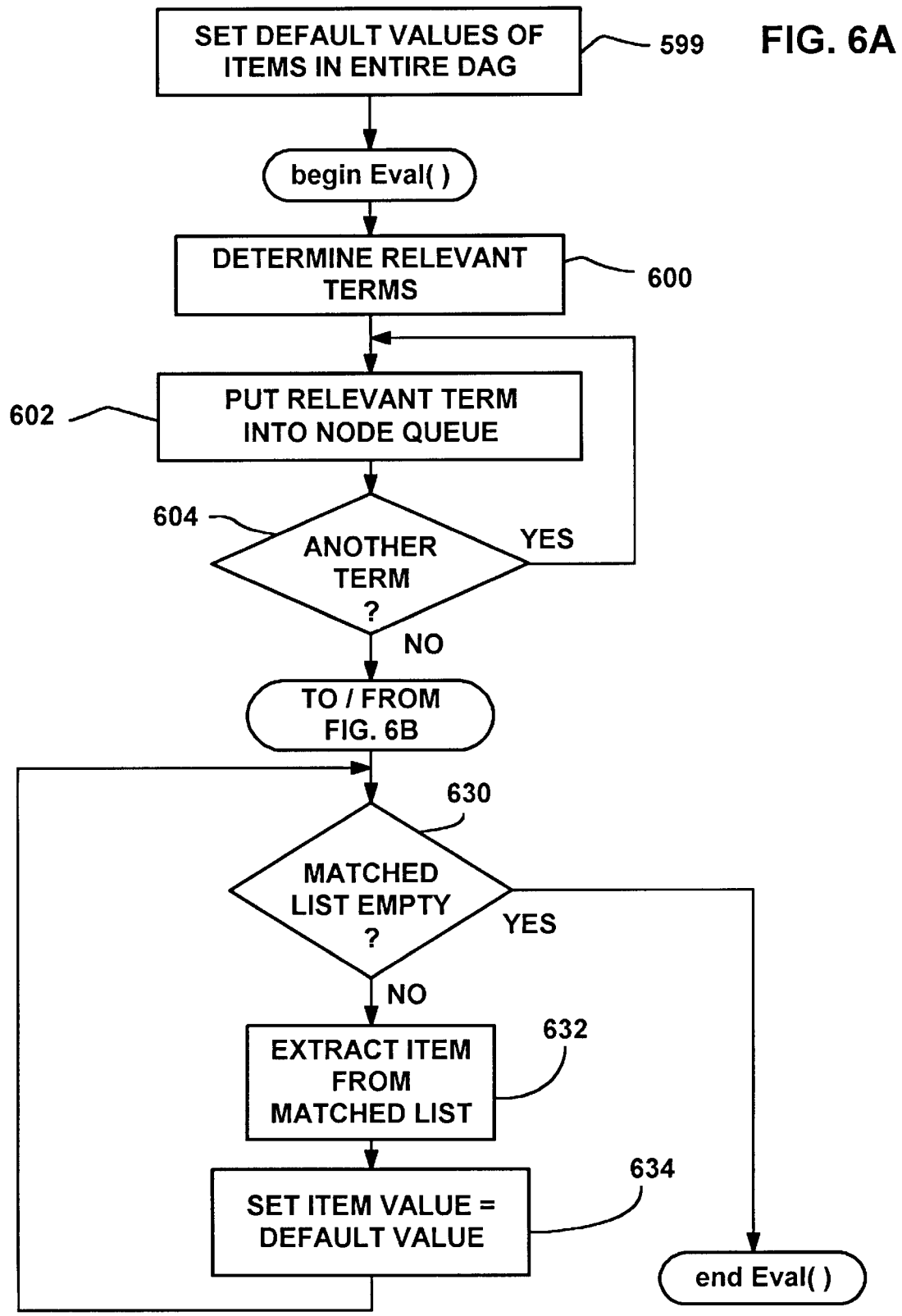
FIGS. 6A–6B comprise a flow diagram representing the general steps taken to evaluate a document against the queries represented by the directed acyclic graph of FIG. 5.
Figure 6B:
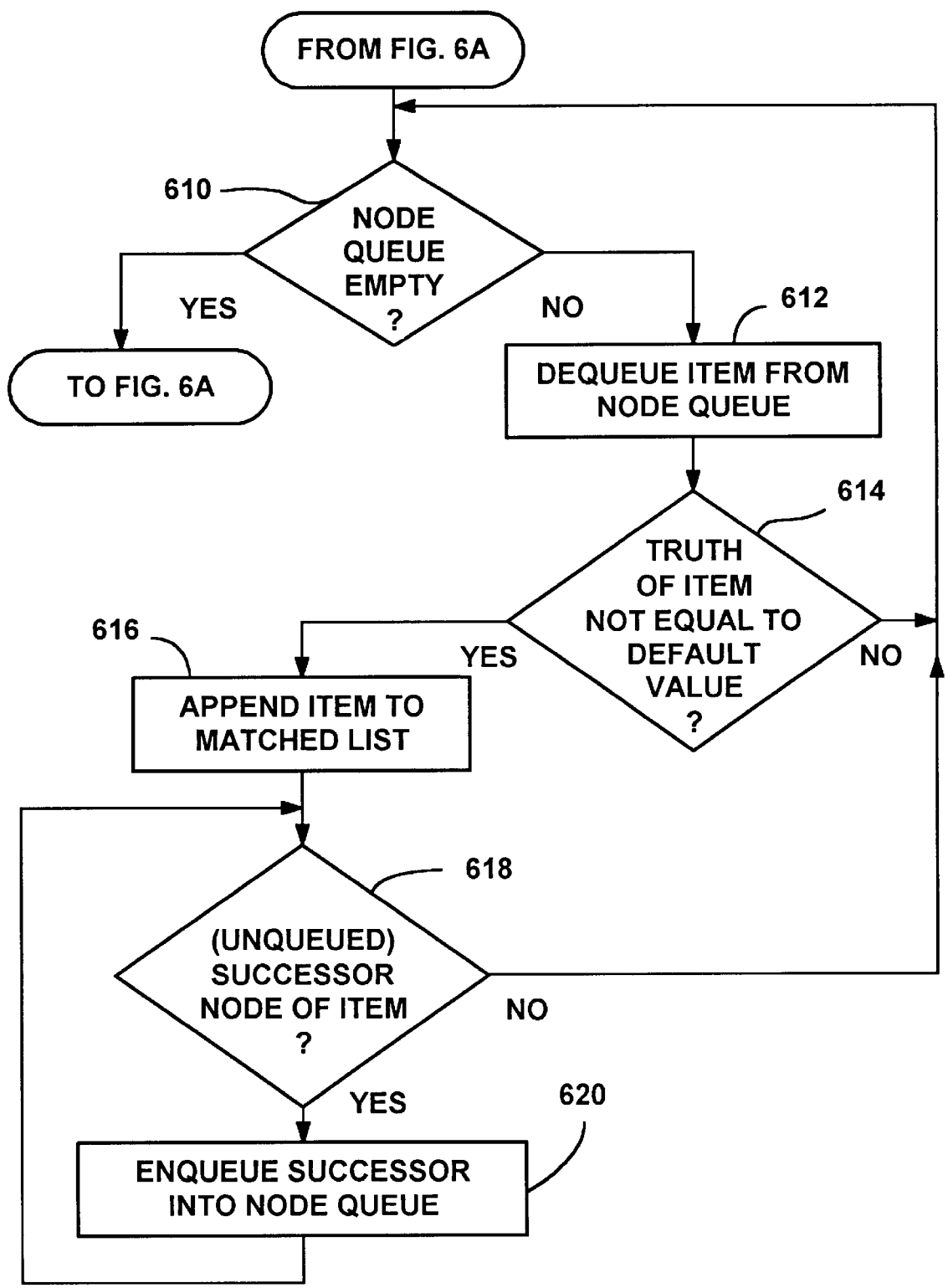

Turning to an explanation of the operation of the invention when a document is evaluated against a constructed DAG, FIGS. 6A–6B represent the general steps for the document filtering process 34. Before the main filter process 34 begins, however, the default truth value of each node in the DAG 40 is preset at step 599. For the present example wherein only monotone queries are present in an exact-match filtering process, the default truth values are all false. As will be described below, with non-monotone operators and/or probabilistic filtering, the default values may be preset to other values. It should be noted that the pre-setting of the DAG 40 need only be done initially, (i.e., not for each document evaluated in the filtering process), and thus may be performed as part of the construction process 42.

A pre-filtering process 66 is performed at step 601 to determine which of the terms in the document match terms in the term dictionary 54, and hence correspond to the source nodes in the DAG 40. To this end, known multi-pattern matching techniques are used, effectively speeding up the filtering process 34 by eliminating the traversal of irrelevant nodes during the evaluation. In a simple model wherein no wildcard search terms are used, the pattern matching technique can simply look up the document's terms (e.g., textual words) therein in the term dictionary 54, and discard those terms not found. More sophisticated multi-pattern matching processes, such as those described by S. Wu and U. Manber, "A Fast Algorithm for Multi-Pattern Searching," Technical Report No. 94-17, Dept. of Computer Science, University of Arizona (1994), enable the use of wildcard search terms both before and/or after other character patterns, e.g., "*arg*" can represent many words including bargain, barge, barges and so on. Note that a wildcard search term can be simply added to the term dictionary 54 and to the DAG 40 in its wildcard form, (e.g., with one or more asterisks, question marks and/or so on), provided that the multi-pattern matching technique properly recognizes the terms which satisfy the wildcard. For example, if the term "cargo" is in a document while the terms "*arg*" and "cargo" are in the term dictionary 54, the multi-pattern matching process 66 will recognize and identify both "cargo" and "*arg*" as relevant source nodes in the DAG 40.

For purposes of the present example, a document 36, is determined by step 600 to have two relevant terms therein, "Prodigy" and "Lycos" with respect to the DAG 40 (FIG. 5). This incoming document 36, is filtered against the DAG 40 beginning at step 602, where the corresponding pointer of the first relevant term is placed into a queue, known as the node queue 60 (FIGS. 7A–7H). Thus, in the present example the pointer to the term "Prodigy," equal to P3, is placed in the node queue 60. Note that for purposes of readability herein, terms are identified by integers, beginning at zero, while internal nodes are identified by integers, beginning at one and following the characters "QN." Of course, both terms and internal nodes identify one another by 32-bit pointers or the like.

Step 604 tests if another matched term is available for placing in the node queue 60, and, since in the present example "Lycos" is also known to be a relevant term in the document $36_1$, (step 600 ), the filtering process 34 loops back to step 602. At step 602, the pointer to "Lycos" of value P4 is similarly added to the node queue 60. In this manner, steps 602–604 thereby pre-fill the node queue 60 with the pointers of the terms known to be in the document $36_1$. At this time, the node queue appears as in FIG. 7A, i.e., containing the term pointers P3 and P4.

Step 606 tests if the node queue 60 is empty, which, as will become apparent below, will eventually occur as term pointers and node identifiers are removed from the node queue 60 and processed. For now, however, the node queue 60 contains the term pointers P3 and P4, and thus the process continues to step 610 of FIG. 6B. At step 610, an item, in this case the term of pointer P3, is dequeued from the node queue 60, whereby the node queue 60 has remaining therein only the term pointer equal to P4 (representing "Lycos").

At step 614, the truth of the dequeued item is evaluated by determining whether the document contains the term (in the case of a term), or satisfies the Boolean expression (in the case of a query). Since in this example the default truth value is always false, and since the document is known to contain the terms in the node queue 60, terms are always true. As a result, the process branches to step 616 where the dequeued item of value P3 is appended to a list of matched nodes, i.e., a matched list 62.

The filtering process 34 continues to step 618, where each successor node of the true node, if any, is enqueued into the node queue 60. As described above, each term (source node in the DAG) or sub-expression operator (internal node in the DAG) has pointers to its immediate successor nodes, and thus the identity of each successor node of each term or query node is known. As represented in FIG. 5, step 618 thus determines that the term "Prodigy" (pointer value P3) has a successor node, identified herein as QN2. Consequently, step 620 enqueues this item (node QN2) into the node queue 60, whereby the node queue 60, along with the match list 62, appear as in FIG. 7B. Since only QN2 is a successor node of the term "Prodigy," there are no other successor nodes at step 618, and the process returns to step 610.

It should be noted that a node is only enqueued into the node queue 60 at step 620 if that node is not already present therein, i.e., each entry in the node queue 60 is distinct. For example, if a document filtered against the DAG 40 of FIG. 5 contains both "MSN" and "AOL," an evaluation of the term "MSN" would result in QN1 being enqueued, as would an evaluation of "AOL." A simple lookup in the node queue 60 before adding a node prevents such an occurrence, thereby ensuring that a node is only tested once for each document.

Figure 7A:
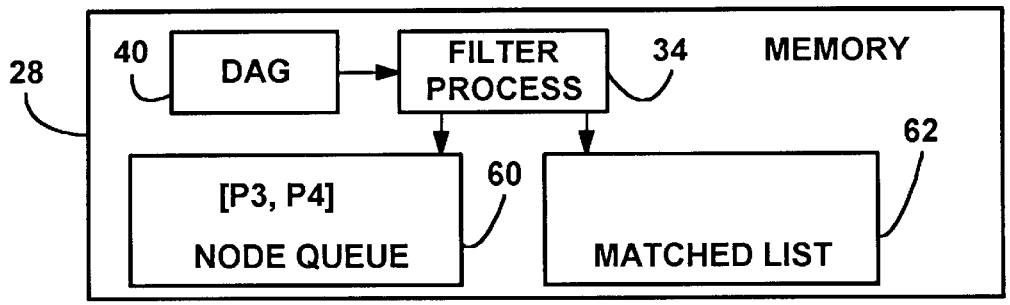
FIGS. 7A–7H represent a series of memory snapshots as the directed acyclic graph of FIG. 5 is evaluated against an incoming document in accordance with the flow diagram of FIGS. 6A–6B.
Figure 7B:
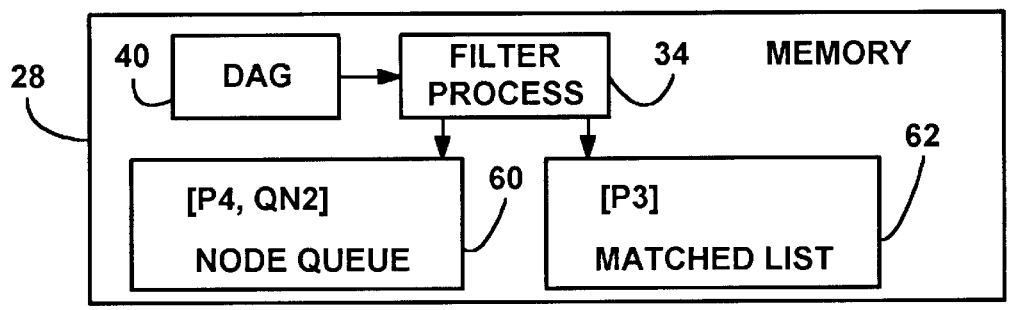
Figure 7C:
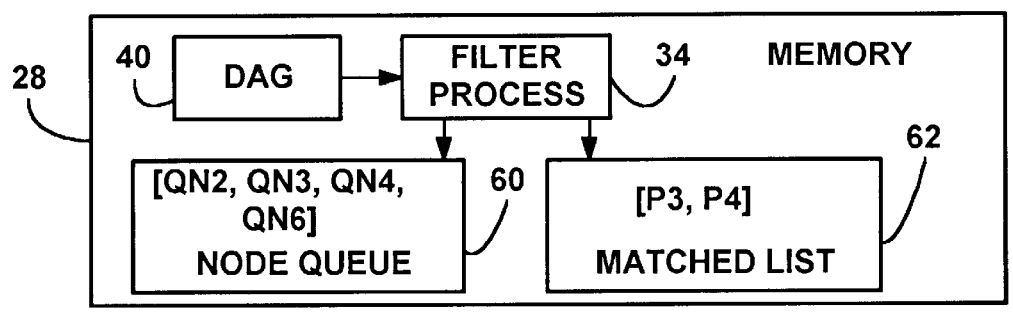

At step 610, the node queue 60, which contains P4 ("Lycos") and Q2, is not empty, and consequently step 612 dequeues the pointer P4 from the node queue 60. Again, terms are true at step 614 (and the default value is false), and thus the process branches to step 616 where the term pointer is appended to the matched list 62. As best shown in FIG. 5, "Lycos" has a number of successor nodes, identified as QN3, QN4 and QN6. Accordingly, steps 618–620 successively add these nodes to the node queue 60, after which the node queue 60 and matched list 62 appear as represented in FIG. 7C.

Although not necessary to the invention, it should be noted that when an item is determined to be true at step 614, it is feasible to not only append the item to the list of matched nodes (step 616), but also to place corresponding user identities into a list associated with the document. Once the document has been evaluated, the document may be delivered to those identified in the list. However, compiling such a list takes time, and thus it has been found more efficient to add users to such a delivery list after the document filtering 34 process is complete, i.e., outside of the loop of steps 610–620. Preferably, the filtering process 34 instead outputs the matched list 62 containing term and query identifiers. A copy of the matched list 62 is then provided to another process 64 (FIG. 2), possibly on a separate machine, for matching the nodes in the matched list 62 to the query identifiers associated and stored therewith, and then with the identities of the users who submitted those queries, for the subsequent document delivery.

Figure 7D:
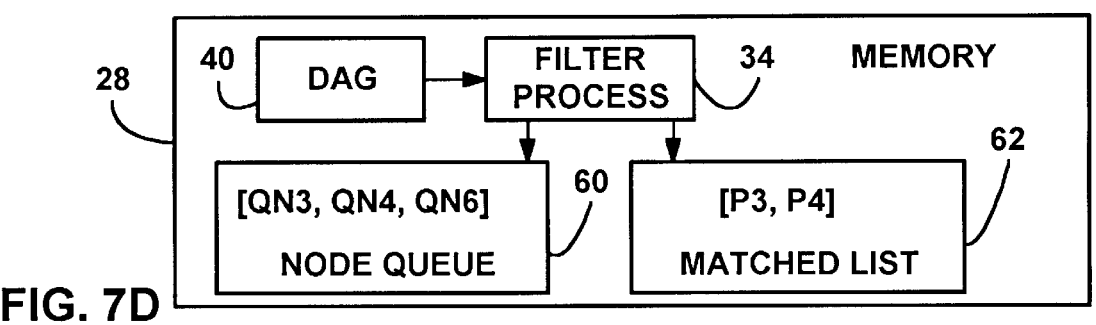
Figure 7E:
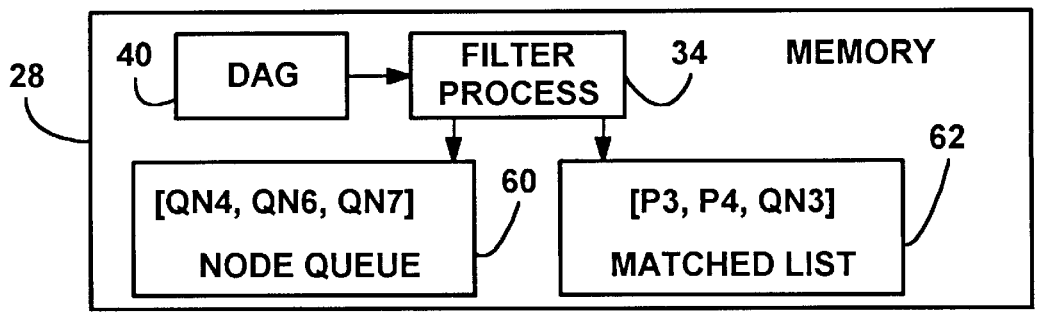
Figure 7F:
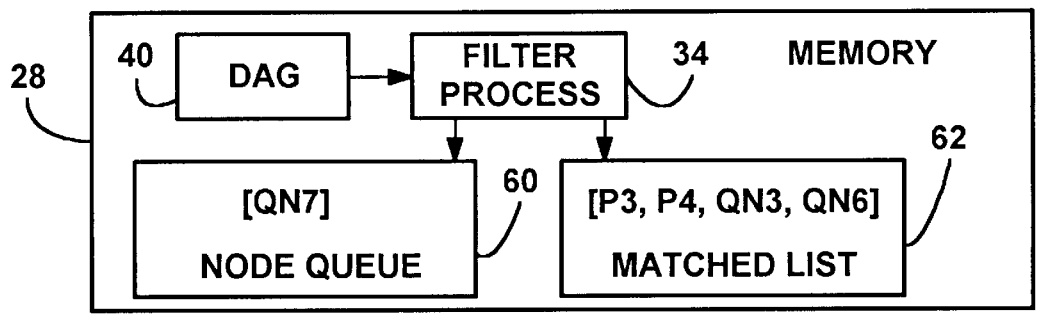
Figure 7G:
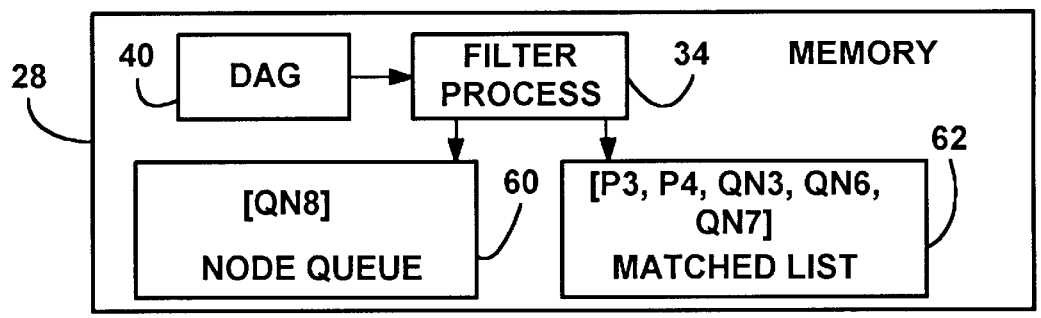
Figure 7H:
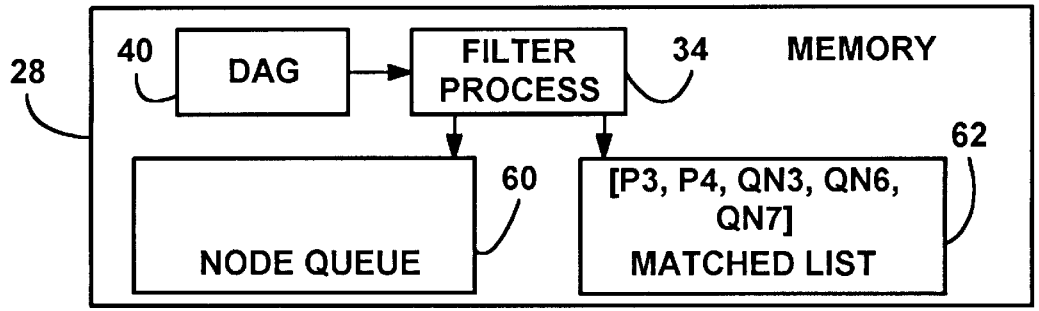

In any event, the process 34 returns to step 610 where the node queue 60 is determined to have at least one item therein, and thus the process branches to step 612 where the item QN2 is dequeued therefrom as shown in FIG. 7D. Step 614's evaluation of QN2 proves false, however, since both "Prodigy" and "AOL" do not appear in this document $36_1$, and thus step 614 returns the process to step 610 without making any additions to the node queue 60 and/or the match list 62.

As can be appreciated, determining whether a node is true or false requires information about the truth of its arguments, i.e., its left and right predecessor nodes. One way in this is accomplished is to have each node maintain pointers to its predecessor nodes, from which the truth of the predecessor nodes may be ascertained and operated on according to the Boolean operator of the successor node. Note that this works because of the way in which the DAG 40 is constructed and evaluated, i.e., upwards from left to right, so that predecessor nodes, if evaluated at all, are evaluated before their successors. Those predecessor nodes which are not evaluated essentially remain false.

As an optimization, however, rather than have each node maintain pointers to its two predecessor nodes, (so that the successor node can establish the truth values of its predecessors to determine its own truth), the truth of the predecessor nodes can be passed to the successor node when each predecessor node is evaluated, if at all. For example, in the instance of a single document being evaluated, when a predecessor node is determined to be true at step 514, a truth counter can be incremented in each successor node of the predecessor node, (such as within the loop of steps 618–620). Later, when the successor node is evaluated, if the truth count is one or greater and the successor node represents an OR operator, the successor node is also true. If the successor node represents an AND operator, the truth counter containing the truth information of its predecessor nodes has to equal two for the successor node to be true. Note that this counter should be reset to zero just after it is tested for its truth, so that the DAG will be in a proper initial default state for the next document.

For purposes of simplicity, the evaluation of the remaining nodes (QN2, QN3, QN4, QN6 and later QN7 and QN8) in the node queue 60 will not be described in detail. However, as can be understood by following the above-described steps in conjunction with the various states of memory shown in FIGS. 7E–7G, the filter process 34 continues until all relevant nodes have been tested, that is, when all enqueued nodes have been dequeued and the node queue 60 is empty at step 610. At that time, the matched list 62 contains the terms and nodes (P3, P4, QN3, QN6, and QN7), corresponding to the QueryIDs (QueryID3, QueryID6 and QueryID7) that were satisfied by the document. Note that if a user is allowed to submit a single term as a query, (e.g., simply seeking all documents containing "Prodigy"), the matched list 62 also contains a pointer to this term if the term was in the document.

Once the document has been filtered, resulting in the matched list 62 being provided, the DAG 40 must be reset for the next document. Rather than reset the entire DAG 40, however, it is more efficient to reset only those items which have changed from their default values. In the present example, those values are those nodes which have changed from false to true. The true values are in the matched list 62, and thus, (after passing a copy of the match list 62 to another process 44 for determining the corresponding users), steps 630–634 empty the match list, one item at a time, while resetting the default values of those nodes to false. Once the matched list 62 is emptied in this manner, the DAG 40 is reset and ready for the next document.

While the above described process functions extremely well with monotone Boolean operators, a modification to the above-described process is necessary if non-monotone operators such as "NOT" are allowed. More particularly, pre-filtering to determine relevant terms does not guarantee that those terms are true. For example, if an "AND NOT" type of query is present and the NOT term appears in the document, that query is false for that document. Similarly, a false evaluation in the DAG can become true by a negation operator, e.g., if a query seeks documents containing "Money AND NOT (Cash or Checks)," and the only relevant term contained in the document is "money," the query is true.

To handle negation, the internal nodes are initially associated with a default truth value that is false for monotone operators including AND and OR, and true for non-monotone operators including NOT. Presetting the nodes in this manner can be accomplished by setting all default truth values in the DAG 40 to the truth values which result from evaluating an empty document. Then, since all source nodes are false, when evaluating each node, the actual, inverted values of the nodes that correspond to a non-monotone operator become true. Monotone operators, that are not inverted, remain false. Once the default truths have been set to their corresponding actual value, which, as can be appreciated can take place at the time of construction of the DAG prior to the filtering process, the flow diagram of FIGS. 6A–6B properly evaluates a document. More particularly, when the truth of a node is evaluated against a document, those queries which have truth values opposite their default truth values will be added to the matched list 62, while those which are the same as their default values will not be added.

Figure 8:
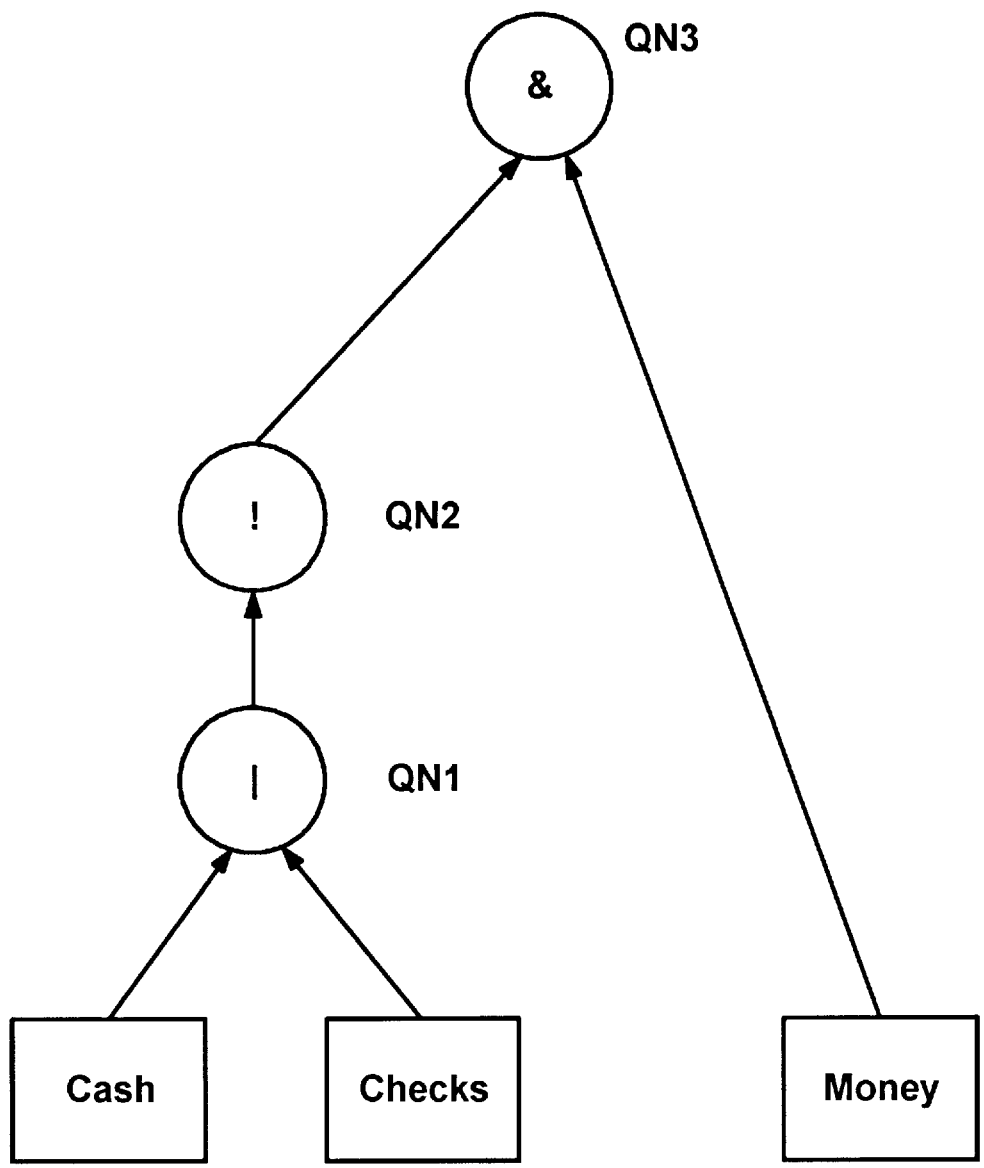
FIG. 8 represents a directed acyclic graph containing exemplary query information when a query contains a non-monotone operator.

By way of example, FIG. 8 shows the DAG 40 that is constructed for the query "Money AND NOT (Cash or Checks)." Note that this query is true only if neither "Cash" nor "Checks" appear a document. In the DAG 40, the nodes representing the AND and the OR operators are both stored with a default value of false, and the node representing the NOT (!) operator with a default value of true.

In the manner described above, if a document containing "Money" is the only relevant term in a document (as determined at step 600), the query is true, and will be added to the matched list 62 when the steps of the flow diagram are used to evaluate the DAG 40. This is readily apparent from the flowchart of FIGS. 6A–6B, wherein the pointer to the term "Money" is placed into the node queue at step 602, dequeued at step 612 and determined to be true at step 614. Because "Money" has a default truth value of false and an actual value of true, the successor node of the term "Money," QN3, is enqueued into the node queue 60 at step 620. When QN3 is later evaluated at step 614, the node determines the actual value of its predecessor nodes, (QN2 and "Money"), both of which are true, and is thus actually true. Since this actual value does not equal QN3's default value of false, the process branches to step 616 where QN3 is added to the matched list 62.

Note that a number of considerations arise when non-monotone operators are allowed. One such consideration is that the nodes which were added to the matched list are to be reset to their default values in steps 630–634. As a result, the default values of matching nodes must be separately maintained. Alternatively, a simple test can be added to the default value resetting loop of steps 630–634, for example testing the node operator whereby monotone nodes are reset to false and non-monotones to true.

Another consideration is directed to the truth value of a predecessor node. Since predecessor nodes may not be visited (e.g., QN1 of FIG. 8 was not evaluated when the only relevant term was "Money," predecessor nodes will be unable to pass truth information to their successor nodes. As a result, successor nodes require a way in which to determine the truth values of their predecessor nodes, either by maintaining a pointer to each predecessor node or by some other mechanism. For example, one such other mechanism involves providing each successor node with the default truth values of its predecessor nodes (such as via a counter), and allowing the predecessor node to change the value (increment or decrement the counter) when and if the predecessor node is evaluated. If the predecessor node is not evaluated, the predecessor default value accurately reflects the truth of that predecessor node. Of course, the default predecessor truth information maintained by the successor node also needs to be reset when the DAG is reset.

In any event, continuing with the explanation of the DAG 40 of FIG. 8, consider a second document having been received, the second document including the relevant terms "Money" and "Cash." This time, the two relevant terms "Cash" and "Money" (actually the pointers thereto) are successively enqueued into the node queue 60 by steps 602 and 604. When "Cash" is dequeued (step 612) and evaluated (step 614), the term is true and placed into the matched list 62. This time, the successor of "Cash," QN1, is enqueued into the node queue 60 at step 620. Note that "Cash," the predecessor node, may pass its truth value to QN1 at this time, or QN1 can later determine via a pointer that "Cash" was true.

When QN1 is evaluated, it has a default value of false. Since "Cash" is true, QN1 is true, however this is changed from QN1's default value of false. Consequently, step 614 adds QN1 to the matched list 60 and enqueues its successor node, QN2.

When QN2 is evaluated at step 614, it is determined that its predecessor node, QN1, is true. Accordingly, QN2 is actually false, since QN1 is true and thus equals QN2's default value of true. As a result, QN2 is not added to the matched list 62. As can be appreciated, the expression represented by QN2 was not satisfied because of the existence of the term "Cash" in the document.

Lastly, when QN3 is evaluated at step 614, it is determined that its predecessor node "Money" is true, but QN2 is false. Accordingly, QN3 is actually false, which is the same as its default value of false, and as a result, QN3 is not added to the matched list 62. As can be appreciated, the expression represented by QN3 was not satisfied because of the existence of the term "Cash" in the document.

As another optimization, regardless of whether non-monotone operators are present, when the exact-match implementation is being used, a batch of documents can be simultaneously evaluated against the DAG using a bit-vector model. To this end, since the truth value at each node can be represented by a single bit, the truth of number of documents can be represented by that number of bits in a given unit of storage (thirty-two bits at present). For example, if the term "AOL" is in the fourth, eighth, twentieth and thirty-first documents in a thirty-two document batch, the node representing this term stores the truth in a thirty-two bit storage unit as 00010001 00000000 00010000 00000010 binary (ordered such that left equals one and right equals thirty-two). Similarly, if "Prodigy" is in the seventh, eighth, fourteenth and thirtieth documents, the relationship is represented by as 00000011 00000100 00000000 00000100 binary in the node.

Then, when an internal node is evaluated at step 614, for each document in the batch, the truth of the node equals the corresponding bitwise logical operation represented by that node. For example, in FIG. 5 the node QN2 ("Prodigy & AOL") is true for the documents wherein each bit is non-zero following a logical AND of the two values, i.e., equal to 00000001 00000000 00000000 00000000, or only the eighth document. When QN2 is stored in the matched list 62, this 32-bit number is also made available so that the appropriate matching document or documents can be determined outside of the filtering process. Although more nodes are likely to be tested with this bit-vector model, (since having more documents will produce more terms and more matches), since each node is evaluated only once for numerous documents, the overall speed of the filtering process is increased. A sixty-four bit implementation is being considered for the future.

Note that with the bit-vector model, thirty-two counters at least two bits in length would be needed to avoid having each node maintain pointers to its two predecessor nodes, (otherwise, the pointers would be necessary so that the successor node can look up the truth of its predecessor nodes to determine its own truth). Instead, the truth of each predecessor node can be passed to the successor node as the thirty-two bit vector, when and if the predecessor node is evaluated. Since a predecessor node (e.g., left predecessor node) of a given successor node does not know about the other predecessor node (e.g., right predecessor node), a flag or the like is maintained with the successor node so that the predecessor node does not overwrite the other predecessor node's thirty-two bit truth vector. For example, when a successor node is enqueued at step 620, the flag is tested, and if clear, the thirty-two bit vector is written to a first location therefor in the successor node and the flag is set. Conversely, if the flag was already set, the thirty-two bit vector is written to the second location therefor in the successor node. Later, when the successor node is evaluated, values in the two locations are OR-ed if the successor node represents an OR operator, or AND-ed if the successor node represents an AND operator. The truth with respect to that query for each document in the batch is the bit value therefor that results from the logical operation. The two storage locations and the flag should be reset to the appropriate default values of their predecessor nodes just after they are logically combined so that the DAG will be in a proper initial state for the next document.

Lastly, according to another aspect of the invention, the filtering process employing the DAG 40 facilitates a rapid best match ranking of documents. More particularly, the DAG evaluation estimates the relevance of a document to the queries embedded in the DAG 40. To accomplish this, the default value of a node is set somewhere between completely true or false according to a statistical estimate, sometimes referred to as a belief, that is based on certain data available to the filtering system. Then, instead of testing whether a node's actual value is opposite its default value, the test is whether the actual value for a node with a given document significantly deviates from the node's default value. What constitutes a significant deviation can be tuned. The total amount of deviation, or the number of nodes that deviate, may be used to provide a relative value for a given document for ranking against other documents.

To this end, each node in the DAG is initially assigned a default value corresponding to its belief on an empty document. For example, the default beliefs of terms may be computed from historical estimates of their frequencies in a document, relativized by their inverse frequency in the entire stream of documents, or just left as zero. The default beliefs of internal nodes can be computed using any of a number of models.

Once such model for computing the belief of an internal node is known as the Inference Network Model, based on a more general model described by H. Turtle and W. Croft, *Evaluation Of An Interface Network-Based Retrieval Model*, ACM Transactions on Information Systems, 9(3):187–222 (1991). The general concept is to treat each Boolean expression as a random variable whose probability of being true is the degree to which the document is believed to be relevant to that expression. Thus, the beliefs associated with each expression are estimated based on the probabilities. For an AND node, the belief is the product of the probabilities (between 0 and 1) of its predecessor nodes, i.e., Belief[A AND B]=Belief[A]Belief[B]. For an OR node, the belief is set forth as Belief[A OR B]=Belief[A]+Belief[B]−Belief[A]Belief[B], and for a NOT operator, the belief is expressed as Belief NOT[A]=1−Belief[A]. As can be appreciated, starting with historical data or known sample data, the probabilities can be filled into each type of node using the above formulas.

A fuzzy logic model is also capable of providing a default belief value for each node, using the following formulas:

Belief[A AND B]=min{Belief[A], Belief[B]}

Belief[A OR B]=max{Belief[A], Belief[B]}

Belief NOT[A]1−Belief[A].

However, with this model, only one of an internal nodes two arguments (predecessor nodes) is used. As a result, this model is not believed to be as desirable as others. More particularly, it is somewhat counterintuitive that this model is not sensitive to all its arguments. For example, if the belief of A equals 0.2, B equals 0.2 and C equals 0.9, it is counterintuitive that the default of {A AND B} equals the default of {A and C}.

Another model, known as the p-Norm model, increases the belief associated with the expression as the "distance" of the pair (a,b) from (0,0) increases. The following formulas provide this function.

$$F^{(p)}OR(a, b) = ((a^p + b^p)/2)^{1/p}$$

$$F^{(p)}AND(a,b) = ((1-a)^p + (1b)^p)^{1/p}$$

As can be appreciated, the present invention is extensible to virtually any other model. Moreover, with any of the above-models or other models, it is also feasible for a user to weight terms or sub-expressions so as to rank terms and sub-expressions in order of importance with respect to a document's relevance. This complicates combining common terms and sub-expressions, since one user may indicate a term or sub-expression as highly relevant while another may indicate a lesser relevance. One solution is to treat sub-expressions and terms which are substantially different in importance as distinct from one another in the DAG 40.

Lastly, with probabilistic models, a bit-vector model cannot be used for batching documents, since more than one bit is required to represent a range from true to false. However, it is still feasible to batch documents if less than a half of a storage unit (e.g., four of thirty-two bits) was used for the truth value. For example, if truths ranged from 0 (very false) to 15 (very true), eight documents could be batched with four bits reserved for each document's truth in a thirty-two bit system.

As can be seen from the foregoing detailed description, there is provided a method and mechanism for rapidly and efficiently filtering documents against a collection of queries. The method and mechanism function in a large retrieval system involving a relatively large number of incoming documents and a relatively large numbers of queries. Both monotone and non-monotone operators may be used, and a probabilistic rankings of documents is facilitated. The method and mechanism is capable of simultaneously filtering multiple documents at the same time against a collection of queries, can be utilized with techniques for predetermining relevant terms, and is cost-efficient, reliable and extensible.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method of filtering incoming documents against user queries, comprising the steps of:

receiving a plurality of user queries, the queries including terms connected by logical operators;

embedding the user queries in a directed acyclic graph having a plurality of nodes, each node in the graph including pointers to any successor nodes thereof, the terms in the queries embedded as source nodes in the graph and the operators embedded as internal nodes;

receiving at least one document;

evaluating the at least one document against the directed acyclic graph by comparing at least some of the terms in said document with the source nodes in the directed acyclic graph, and for each term that matches a source node, evaluating an internal successor node of the matched source node based on the logical operator represented by the successor node and truth information of the predecessor nodes thereto, to determine a truth value of said internal successor node; and returning truth information indicative of which of the successor nodes were evaluated as true.

2. The method of claim 1 wherein the step of embedding the user queries in a directed acyclic graph includes the steps of combining common terms into a distinct set of terms, and embedding terms from the distinct set of terms into the graph.

3. The method of claim 1 wherein the step of embedding the user queries in a directed acyclic graph includes the steps of combining common sub-expressions of terms and operators into a distinct set of sub-expressions, and embedding sub-expressions from the distinct set of sub-expressions into the graph.

4. The method of claim 1 further comprising the step of predetermining which terms in the document match which terms in the directed acyclic graph.

5. The method of claim 1 wherein a batch of documents is filtered at the same time.

6. The method of claim 1 further comprising the step of passing truth information from an evaluated predecessor node to each of the successor nodes thereof.

7. The method of claim 1 further comprising the step of maintaining pointers from each successor node to the predecessor nodes thereof, wherein the step of evaluating an internal successor node of the matched source node based on the logical operator represented by the successor node and truth information of the predecessor nodes thereto includes the step of determining the truth of each predecessor node via the pointer thereto.

8. The method of claim 1 further comprising the step of maintaining a default truth value for each node.

9. The method of claim 8 wherein the step of evaluating an internal successor node of the matched source node based on the logical operator represented by the successor node and truth information of the predecessor nodes thereto, includes the step of comparing the truth based thereon with the default truth value and determining that the internal node is true when the evaluated value does not equal the default value.

10. The method of claim 9 further comprising the step of resetting the truth values in the directed acyclic graph.

11. The method of claim 8 wherein each default value is a probability value, and wherein the step of evaluating an internal successor node of the matched source node based on the logical operator represented by the successor node and truth information of the predecessor nodes thereto, includes the step of comparing the evaluated truth value based on the predecessor nodes with the default truth value of the successor node to determine a level of truth of the successor node.

12. The method of claim 11 wherein the level of truth of an internal node corresponds to the amount of deviation from the default value.

13. The method of claim 11 wherein the internal node is considered false when the amount of deviation from the default value is below a threshold amount.

14. The method of claim 1 wherein at least one of the operators embedded as internal nodes is a negation operator.

15. A mechanism for filtering incoming documents against user queries, comprising:

a memory for receiving a plurality of user queries, the queries including terms connected by logical operators;

means for embedding the user queries into a directed acyclic graph in the memory, the directed acyclic graph having a plurality of nodes, wherein the terms in the queries embedded as source nodes in the graph and the operators embedded as internal nodes and each node in the graph includes pointers to any successor nodes thereof;

means for receiving a document;

means for determining which terms in the document correspond to which terms embedded in the directed acyclic graph;

means for evaluating the document against the directed acyclic graph including means for comparing at least some of the terms in the document with the source nodes in the directed acyclic graph;

means for evaluating an internal successor node of each term that matches a source node based on the logical operator represented by the successor node and truth information of the predecessor nodes thereto, to determine a truth value of said internal successor node; and means for returning truth information indicative of which of the successor nodes were evaluated as true.

* * * * *

UNITED STATES PATENT AND TRADEMARK OFFICE
CERTIFICATE OF CORRECTION

PATENT NO. : 5,873,081  
DATED : Feb. 16, 1999  
INVENTOR(S) : Dov Harel

Page 1 of 2

It is certified that error appears in the above-identified patent and that said Letters Patent is hereby corrected as shown below:

ON THE TITLE PAGE:

In Column 2, line 1 of "ABSTRACT": "mechanism for for" should read -- "mechanism for"--.

In Column 3, line 17: "$36_1 36_n$," should read --$36_1$ -$36_n$ --.
In Column 4, line 50: "(Lycos|Yahoo) (Lycos & Alta Vista)" should read --(Lycos|Yahoo) | (Lycos & Alta Vista)--.
In Column 4, line 51: "((Lycos Yahoo)" should read --((Lycos|Yahoo)--.
In Column 6, line 12: "Addop( )" should read --AddOp( )--.
In Column 10, line 6: "36," should read --$36_1$--.
In Column 10, line 9: "36," should read --$36_1$--.
In Column 11, line 45: "One way in this is" should read --One way this is--.
In Column 14, line 29-30: "represented by as" should read --represented as--.
In Column 15, line 60: "Belief NOT[A]1-Belief[A]" should read -- Belief NOT[A]=1-Belief[A]--.
In Column 16, line 9: "$+(1b)^p$" should read --$+(1-b)^p$--.
In Column 16, line 38: "rankings" should read --ranking--.
In Column 16, line 39: "is" should read --are--.

UNITED STATES PATENT AND TRADEMARK OFFICE
CERTIFICATE OF CORRECTION

Page 2 of 2

PATENT NO. : 5,873,081
DATED : Feb. 16, 1999
INVENTOR(S) : Dov Harel

It is certified that error appears in the above-identified patent and that said Letters Patent is hereby corrected as shown below:

In Column 16, line 42: "is" should read --are--.

Signed and Sealed this

Twenty-fourth Day of April, 2001

*Attest:*

NICHOLAS P. GODICI

*Attesting Officer*          *Acting Director of the United States Patent and Trademark Office*